(12) United States Patent
Bruns et al.

(10) Patent No.: US 6,475,094 B1
(45) Date of Patent: Nov. 5, 2002

(54) METHOD FOR MAKING PRODUCT AND PRODUCT HAVING ULTRA HIGH MOLECULAR WEIGHT PLASTIC PARTS

(76) Inventors: Mark W. Bruns, 380 Connecticut St., Hutchinson, MN (US) 55350; Steven A. Bruns, Route 1, Box 96, Hector, MN (US) 55342

( * ) Notice: Subject to any disclaimer, the term of this patent is extended or adjusted under 35 U.S.C. 154(b) by 0 days.

(21) Appl. No.: 09/535,691

(22) Filed: Mar. 27, 2000

Related U.S. Application Data (63) Continuation-in-part of application No. 29/098,315, filed on Dec. 28, 1998, now Pat. No. Des. 426,146.

(51) Int. Cl.[7] .............................. B21H 3/02; B23G 9/00
(52) U.S. Cl. ..................... 470/8; 470/5; 470/9; 470/11; 470/12; 470/17
(58) Field of Search ............................ 470/2, 9, 10, 11, 470/12, 17, 5, 6, 8

(56) References Cited

U.S. PATENT DOCUMENTS

| | | | |
|---|---|---|---|
| 2,400,094 A | 5/1946 | Benning et al. | |
| 2,929,109 A | 3/1960 | Cresap | |
| 2,978,353 A | 4/1961 | Meier | |
| 3,208,900 A | 9/1965 | Inklaar | |
| 3,433,108 A | 3/1969 | Ondeck | |
| 3,455,483 A | 7/1969 | Inklaar | |
| 3,579,684 A | 5/1971 | Duffy | |
| 3,592,100 A | 7/1971 | Trumbull et al. | |
| 3,616,827 A | 11/1971 | Stillwagon, Jr. | |
| 3,779,105 A | 12/1973 | Triplett et al. | |
| 3,847,888 A | 11/1974 | Baumgaertner | |
| 3,858,262 A | 1/1975 | Duffy | |
| 3,975,481 A | 8/1976 | Baumgaertner | |
| 4,055,862 A | 11/1977 | Farling | |
| 4,172,112 A | 10/1979 | Tsukagoshi et al. | |
| 4,452,556 A | 6/1984 | Nelson et al. | |
| 4,496,002 A | 1/1985 | Jones et al. | |
| 4,508,759 A | * 4/1985 | Wallace | 470/9 |
| 4,800,786 A | 1/1989 | Arnold et al. | |
| 4,813,833 A | 3/1989 | Haab | |
| 4,887,951 A | 12/1989 | Hashimoto | |
| 4,979,355 A | 12/1990 | Ulevich | |
| 5,009,133 A | 4/1991 | Carey | |
| 5,453,234 A | 9/1995 | Gusik | |
| 6,010,141 A | * 1/2000 | Huntimer et al. | 280/433 |
| 6,143,232 A | * 11/2000 | Rohr | 264/460 |
| 6,187,420 B1 | * 2/2001 | Tajima et al. | 428/313 |
| 6,224,809 B1 | * 5/2001 | Orndorff, Jr. | 264/255 |
| 6,315,798 B1 | * 11/2001 | Ashby et al. | 623/20.17 |

* cited by examiner

Primary Examiner—Ed Tolan (57) ABSTRACT

A method of making a UHMWPE body combined with a bolt, a cap screw, a reinforcing member uses a compression molding machine equipped with a male and female mold set. Particulate UHMWPE dispensed into the cavity of the female mold surrounds the head of the bolt and screw and reinforcing member. Pressure and heat applied to the particulate UHMWPE molecularly bonds the UHMWPE to the bolt, screw, and reinforcing member.

31 Claims, 12 Drawing Sheets

METHOD FOR MAKING PRODUCT AND PRODUCT HAVING ULTRA HIGH MOLECULAR WEIGHT PLASTIC PARTS

CROSS REFERENCE TO RELATED APPLICATION

This application is a continuation-in-part of U.S. application Ser. No. 29/098,315 filed: Dec. 28, 1998.

FIELD OF THE INVENTION

The invention relates to the art of pressure molding ultra high molecular weight polyethylene (UHMWPE) to molecularly bond the UHMWPE to an article, such as a bolt, scres, plate and reinforcing member.

BACKGROUND OF THE INVENTION

Ultra high molecular weight polyethylene, herein identified as UHMWPE, is a thermoplastic having advantageous characteristics including high abrasion resistance, low coefficient of friction and exceptional toughness. UHMWPE is used in a number of applications in various industries which require abrasion resistant and low coefficient parts. The average molecular weight of UHMWPE is from 4 to 5 million. The plastic polymer is made up of long branch fee chains, and when compression molded, gives a material of impact strengths at room temperature greater than other thermoplastics. The structure of UHMWPE makes it highly resistant to repeated stress, impact and abrasion. The use of UHMWPE is limited due to difficulties in its processing. The high melt viscosity of UHMWPE limits its processing to presses and screw or ram extruders. The formed pieces are machined to desired shapes. Examples of processes for molding UHMWPE are disclosed in U.S. Pat. Nos. 2,400,094; 3,847,888; 3,975,481 and 5,453,234.

SUMMARY OF THE INVENTION

The invention comprises a method for making solid articles by and molecularly bonding to metal and other materials and the completed articles, such as a bolt having a UHMWPE cap, a socket having an UHMWPE jacket, and an UHMWPE product having a reinforcing member encapsulated within the product. The method for making UHMWPE articles uses a compression molding machine equipped with a male and female mold assembly. The female mold has at least one cavity having the size and shape of the completed UHMWPE article. The male mold has a plunger that fits into the cavity to apply substantial pressure to particulate or powdered UHMWPE located in the cavity when the female mold is moved relative to the male mold. The female cavity is open to a bolt retaining opening used to position the head of the bolt in the cavity. The particulate UHMWPE is subjected to a large compression force to purge the particulate UHMWPE of air and force UHMWPE under the head of the bolt and densified the UHMWPE around the head of the bolt. An alternative female mold has a boss on the bottom wall of the cavity for accommodating the socket of a socket head cap screw. A collar of UHMWPE is molecularly bonded to the head of the cap screw. A reinforcing member, such as a metal plate, fabric, or glass fibers, is incorporated in the UHMWPE by compressing particulate UHMWPE about the reinforcing member and molecularly bonding the UHMWPE to the reinforcing member. The compressed particulate UHMWPE is heated to a temperature of between 250 and 350 degrees F. to molecularly bond the UHMWPE to the part, such as the head of the bolt, socket, and reinforcing member located in the mold cavity. The male and female molds are heated. The heat is transferred by the mold to the compressed UHMWPE and sustained for a time to ensure that the UHMWPE is totally sintered and molecularly bonded to the article located in the mold. The pressure on the heated UHMWPE is maintained during the heating process. Upon completion of the heating process the mold and UHMWPE is allowed to cool. A cooling liquid is used to enhance the cooling rate of the UHMWPE and article. The pressure on the UHMWPE is maintained during the cooling duration. The cooled combined UHMWPE and article is removed from the female mold by releasing the pressure on the UHMWPE and retracting the cavity from the plunger of the male mold. Air under pressure may be used to separate the UHMWPE and article from the female mold.

The invention includes the combined UHMWPE and article, such as the head of a bolt, a socket, a cap screw, and a reinforcing member. The bolt has a head enclosed within a UHMWPE cap or body with the UHMWPE molecularly bonded to the top, side and bottom surfaces of the head of the bolt. The socket is a hand tool having a cylindrical body. A UHMWPE jacket is molecularly bonded to the outside of the cylindrical body. The cap screw has a head having a socket in its outer end and an outer surface. A collar of UHMWPE is molecularly bonded to the outer surface and end of the head. The reinforcing member, such as a metal plate, metal member, fabric, fiber member or a glass fibers, is located within a body of UHMWPE with the UHMWPE bonded to the reinforcing member to increase the strength of the body of UHMWPE.

DESCRIPTION OF THE PREFERRED EMBODIMENTS OF THE INVENTION

Referring to FIGS. 1 to 6, an elevator bolt 40 has a cylindrical body or stem 41 with external helical threads for accommodating a nut (not shown). Body 41 is joined a square neck 42 adapted to fit into a square hole to prevent rotation of bolt 40 when used with elevator paddles. Neck 42 is connected to a circular head 43 having a flat top surface and an outwardly tapered inner surface. A cap of UHMWPE indicated generally at 44 surrounds head 43. The plastic is a high density polyethylene having a very high molecular weight, herein identified a UHMWPE, characterized as having high abrasion resistance, low coefficient of friction and exceptional toughness. Other plastic materials, such as nylon, mylatron, acetel, and phenolis, can be used to mold cap 44 around head 43. UHMWPE is preferred for uses of bolt 40 that require high abrasion resistance properties. Cap 44 has circular top 46, a cylindrical side wall 47 and an inwardly directed annular lip 48. Top 46 has a flat outer circular surface parallel to the flat top surface of head 43 and a uniform thickness over the entire top of head 43. Side wall 47 extended around the outer peripheral edge of head 43 is joined to lip 48. Top 46, side wall 47 and lip 48 are molecularly attached to or bonded to the adjacent surfaces of head 43. The thickness of the UHMWPE can be increased to molecularly bond the UHMWPE to the neck 42 to assist in preventing rotation of the head 43 relative to cap 44.

A modification of the elevator bolt indicated generally at 49 shown in FIGS. 7 to 11, have threaded body or stem 51, a cylindrical neck 52, and a cylindrical head 53. Cap 54 has a flat top 56 joined to an annular side wall 57 that surrounds the outer peripheral edge of head 53. An annular lip 58 joined to side wall 57 extends under head 53. Top 56, side wall 57 and lip 58 are molecularly attached to or bonded to the adjacent surfaces of head 53.

The heads 43 and 53 of bolts 40 and 49 have circular or round with outwardly tapered bottom surfaces. Bolts having heads with other shapes, such as square, hexagonal, screw slot, and carriage heads, can be provided with UHMWPE caps. The shape of caps 44 and 54 are flat and cylindrical. Caps having other shapes, such as square, oval, rectangular and triangular, can be molecularly attached to the heads of the bolts.

Figure 1:
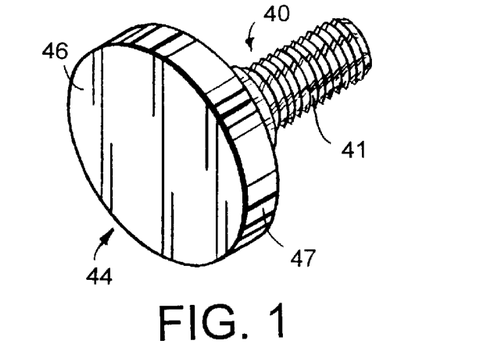
FIG. 1 is a perspective view of an elevator bolt having a head with a UHMWPE cap.
Figure 2:
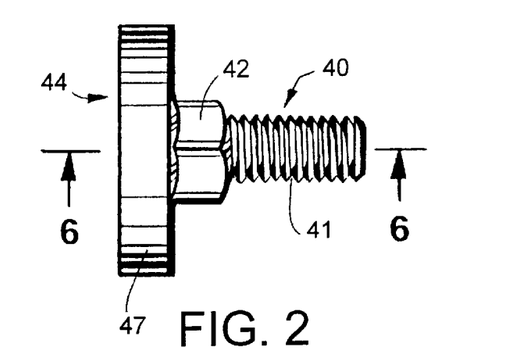
FIG. 2 is a side elevational view thereof.
Figure 3:
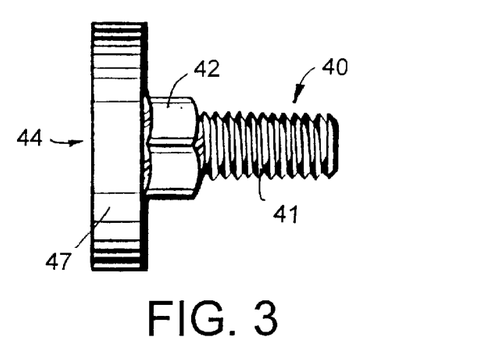
FIG. 3 is a top plan view thereof.
Figure 4:
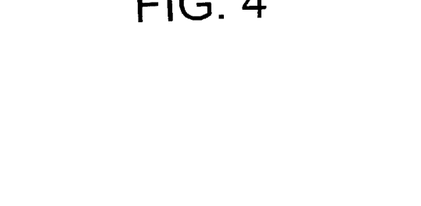
FIG. 4 is an end elevational view of the left or outer end thereof.
Figure 5:
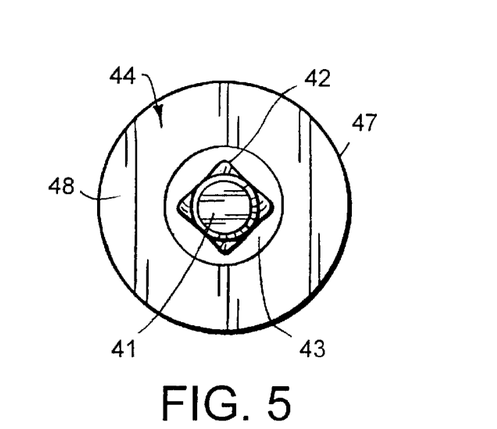
FIG. 5 is an end elevational view of the right or inner end thereof.
Figure 6:
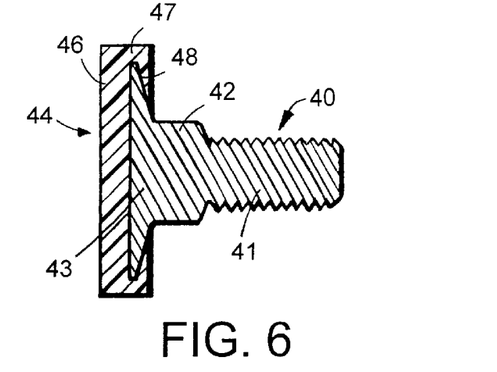
FIG. 6 is a sectional view taken along the line 6—6 of FIG. 2.
Figure 7:
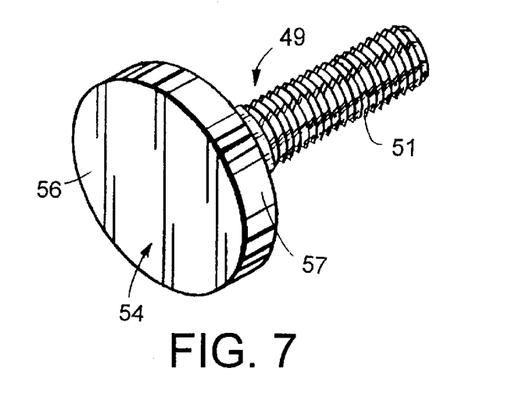
FIG. 7 is a perspective view of a modification of the elevator bolt of FIG. 1 having a head with a UHMWPE cap.
Figure 8:
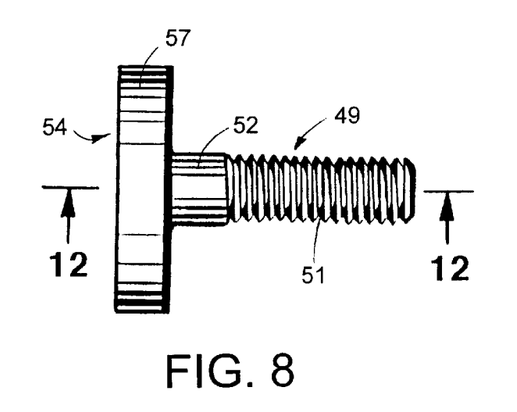
FIG. 8 is a side elevational view of FIG. 7.
Figure 9:
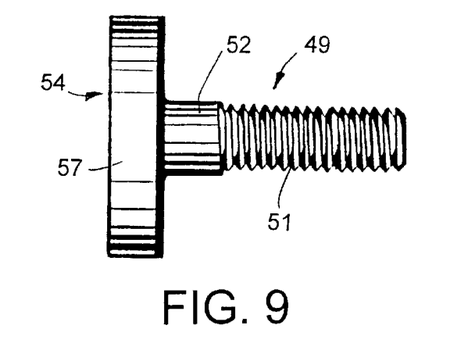
FIG. 9 is a top plan view of FIG. 7.
Figure 10:
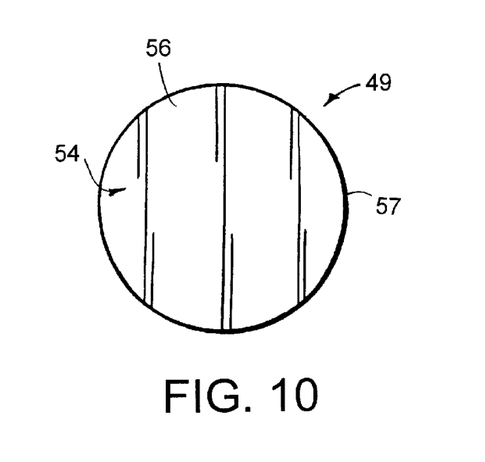
FIG. 10 is an end elevational view of the left end of FIG. 7.
Figure 11:
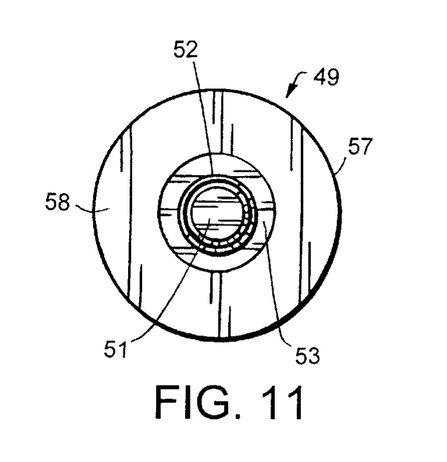
FIG. 11 is an end elevational view of the right end of FIG. 7.
Figure 12:
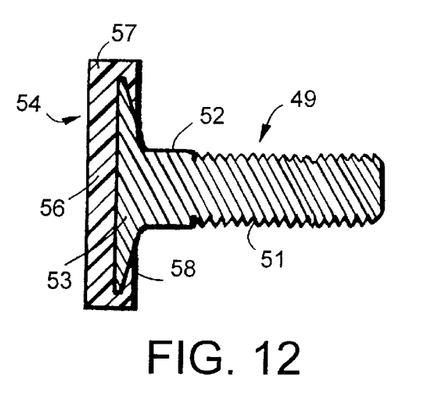
FIG. 12 is a sectional view taken along the line 12—12 of FIG. 8.
Figure 13:
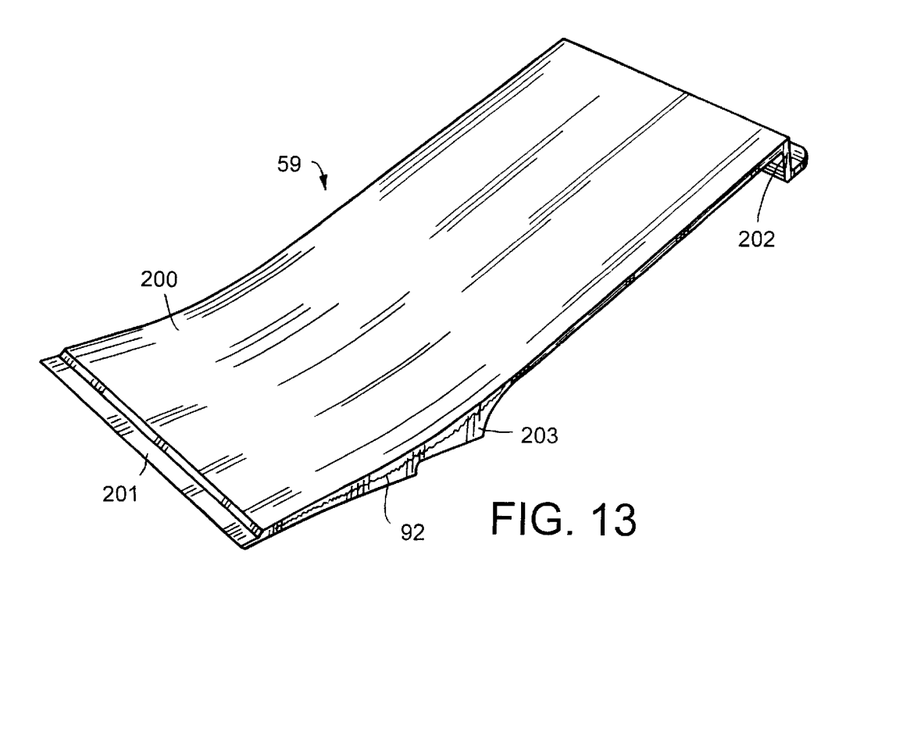
FIG. 13 is a perspective view of UHMWPE combine skid show.
Figure 14:
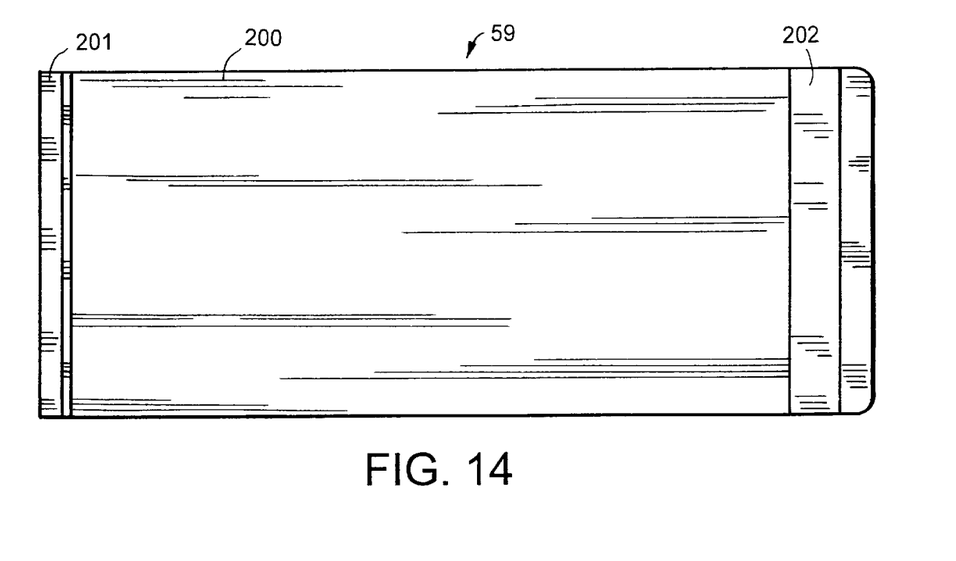
FIG. 14 is a top plan view of FIG. 13.
Figure 15:
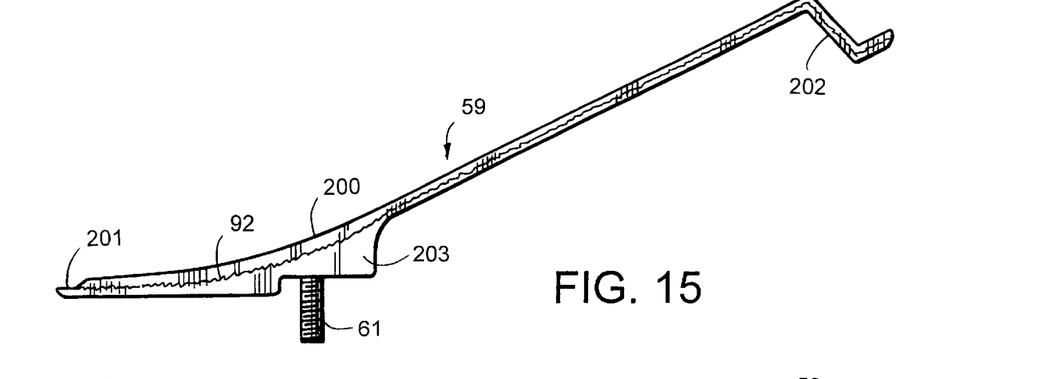
FIG. 15 is a side elevational view of FIG. 13.
Figure 16:
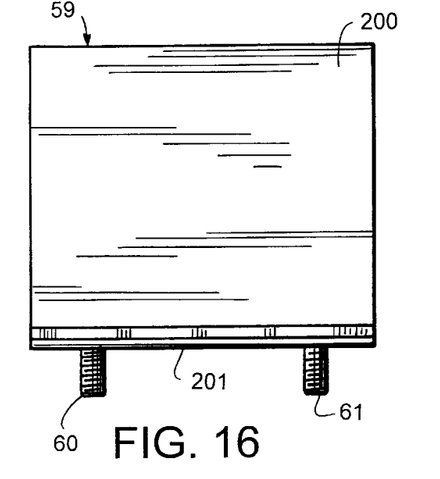
FIG. 16 is a front elevational view of FIG. 13.
Figure 17:
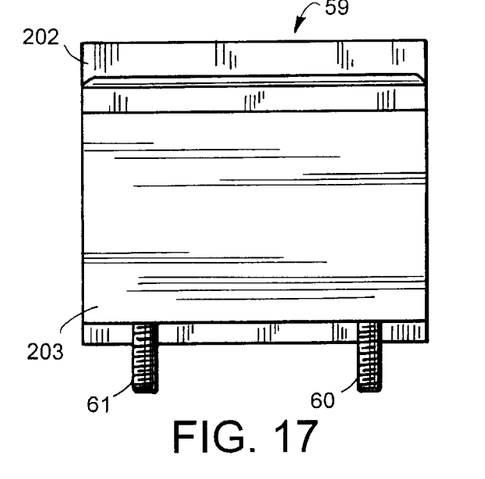
FIG. 17 is a rear elevational view of FIG. 13.
Figure 18:
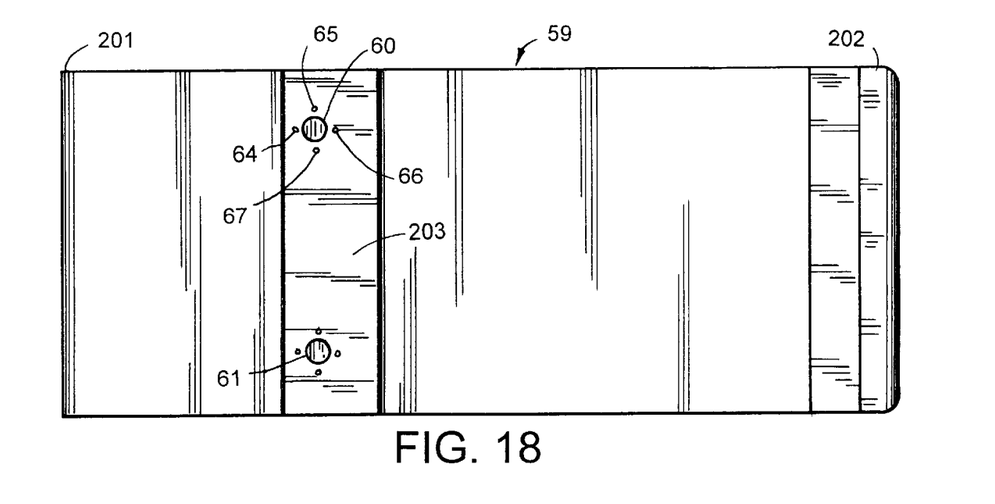
FIG. 18 is a bottom plan view of FIG. 13.
Figure 19:
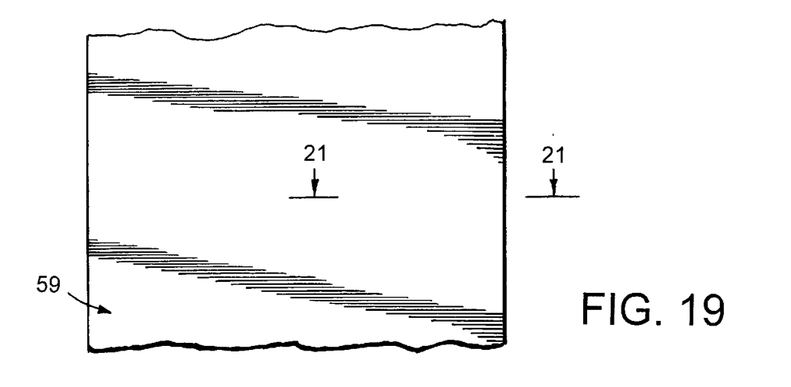
FIG. 19 is a top plan view of a portion of the whole of FIG. 13 having a head bocated in the body of UHMWPE.
Figure 20:
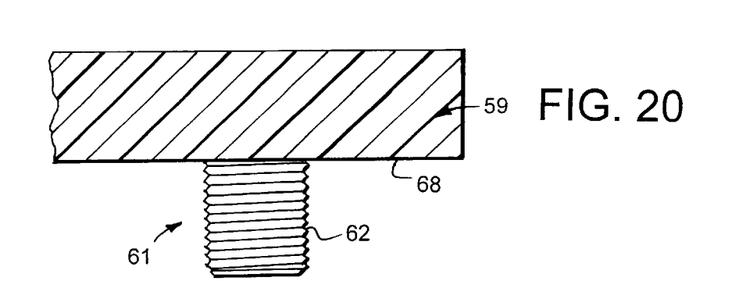
FIG. 20 is a front elevational view of FIG. 19.
Figure 21:
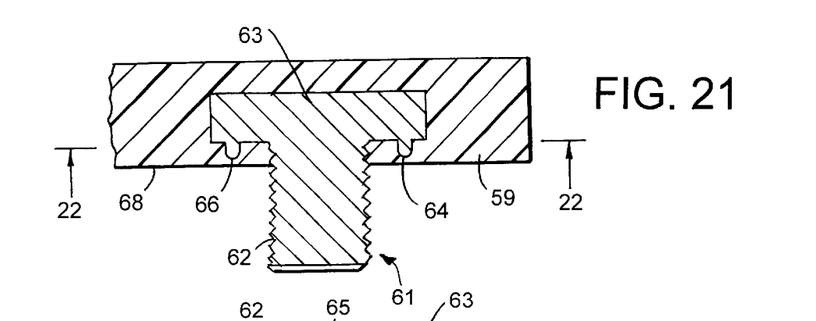
FIG. 21 is a sectional view taken along the line 21—21 of FIG. 19.
Figure 22:
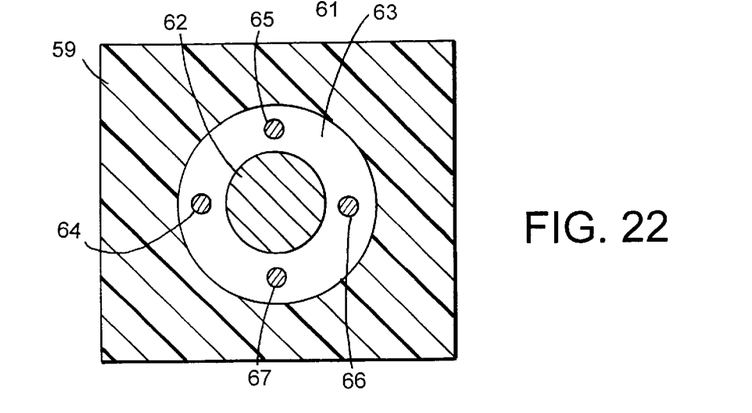
FIG. 22 is a sectional view taken along the line 22—22 of FIG. 21.
Figure 23:
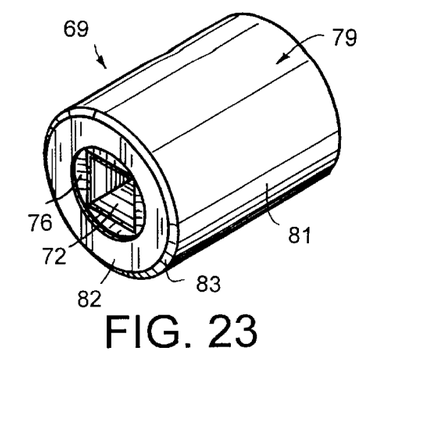
FIG. 23 is a perspective view of a socket tool having a jacket of ultra high molecular UHMWPE.
Figure 24:
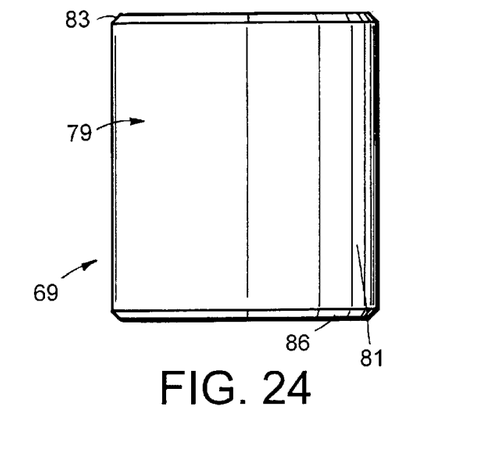
FIG. 24 is a side elevational view of FIG. 23.
Figure 25:
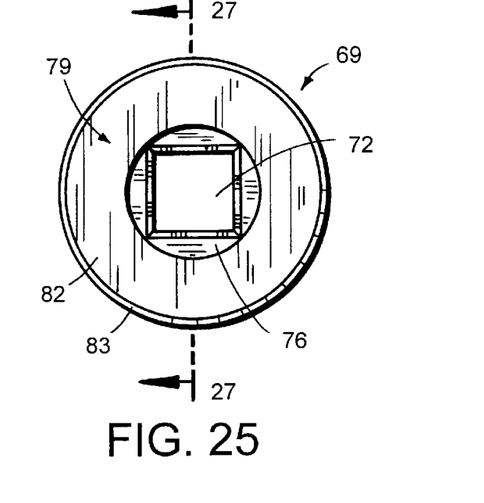
FIG. 25 is a top plan view of FIG. 24.
Figure 38:
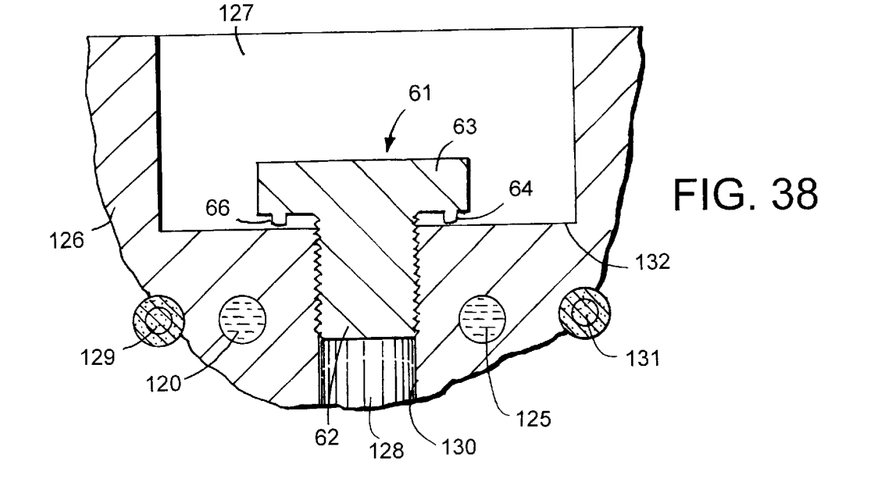
FIG. 38 is a sectional view of a portion of a mold similar to FIG. 35 with a bolt of FIGS. 21 and 22 positioned in the mold.
Figure 39:
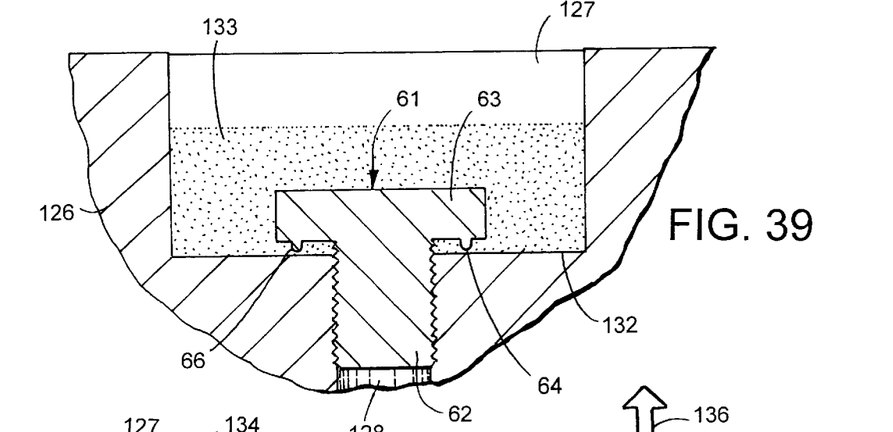
FIG. 39 is a sectional view similar to FIG. 38 with particulate UHMWPE located in the mold.
Figure 40:
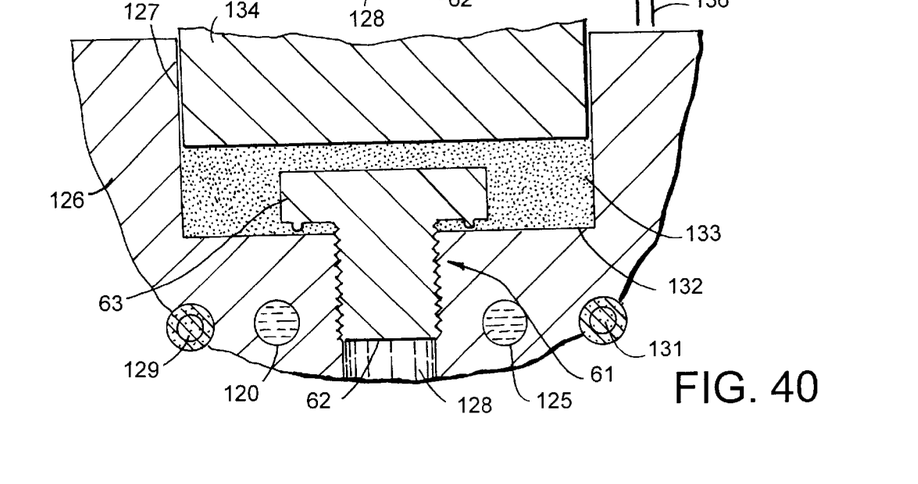
FIG. 40 is a sectional view similar to FIG. 39 with particulate UHMWPE compressed about the head of the bolt.

Referring to FIGS. 13 to 22, a UHMWPE member 59, shown as motor support and skid shoe, is attached to a bolt 60 and 61 extended downwardly from the bottom of member 59. A reinforcing sheet member 92, such as fabric, is located within UHMWPE member 59 to increase its bending strength. Bolts 60 and 61 are identical. The following description is limited to bolt 61. Bolt 61 has a threaded body or stem 62 joined to a circular head 63. Head 63 located below the top or outer surface of member 59 does not interrupt the flat, smooth, and abrasion resistant properties of member 59. As shown in FIGS. 21 and 22 head 63 has downwardly directed extensions or bosses 64, 65, 66 and 67 located around body 62 and projected toward bottom surface 68 of body 59. Member 59 can have other shapes, such as round, cylindrical, oval, arcuate and triangular and support a plurality of bolts with heads embodied in the UHMWPE member. Member 59 has an elongated curved top surface 200 extended from a front transverse lip 201 to a rear L-shaped flange 202. The bottom of member 59 has shoulder or stepped portion 203 having UHMWPE material for anchoring bolts 60 and 61. The head 63, projections 64–67 and a portion of body adjacent head 63 are molecularly attached to UHMWPE member 59. The process of making the UHMWPE member 59 is shown in FIG. 38 to 40.

A socket tool 69, shown in FIGS. 23 to 27 has a UHMWPE jacket 79. Tool 69 has a metal cylindrical body 71 having square hole 72 open to a socket cavity 73. Cavity 73 has a cross sectional area larger than the cross sectional area of hole 72. Twelve V-shaped ridges 75 circumferentially located around cavity are adapted to grip the square and hexagonal heads of nuts and bolts. The inside of cavity 73 can have other shapes to accommodate specific shapes of the heads of nuts and bolts. The size of cavity 73 can vary to fit different sizes of the heads of bolt and nuts. Body 71 has a cylindrical outside wall 74, a flat top wall 76, and an annular flat bottom wall 77. Top wall 76 surrounds the open end of square hole 72. Bottom wall 77 surrounds inwardly tapered portions 78 of the V-shaped ridges 75 which aid in inserting tool 69 on a nut or head of a bolt. UHMWPE jacket 79 has side wall 81 surrounding cylindrical wall 74 of body 71, on annular top wall 82 located on top wall 76 of body 71 and a bottom wall 84 covering bottom wall 77 of body 71. Circular chambers or tapered surfaces 83 and 86 are located at opposite ends of side wall 81. The side wall 81, top end wall 82, and bottom end wall 84 are molecularly attached or bonded to adjacent walls 74, 76 and 77 of body 71. Jacket 79 having low coefficient of friction properties does not mar, scuff, abrade nor scrape recessed surfaces surrounding the heads of bolts and nuts. An example of nuts located in pockets having recessed surfaces are lug nuts used to attach the wheels of automobiles to brake drums. Ratchet wrenches, air wrenches, and turning tools having square drive members are used with socket tool 79 to turn nuts and heads of bolts. The socket tool having an UHMWPE jacket can be joined to the end of a tire iron used to remove and attach lug nuts from threaded studs that hold a vehicle wheel.

Figure 28:
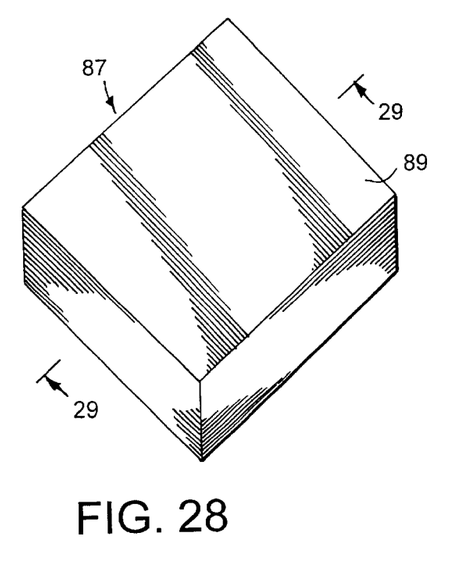
FIG. 28 is a perspective view of a first 27—27E member.
Figure 29:
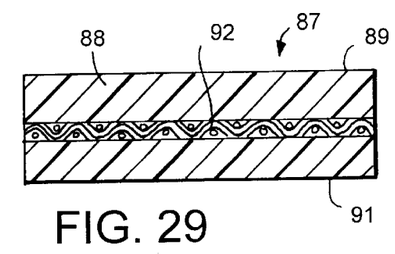
FIG. 29 is an enlarged cross sectional view taken along line 29—29 of FIG. 28.
Figure 30:
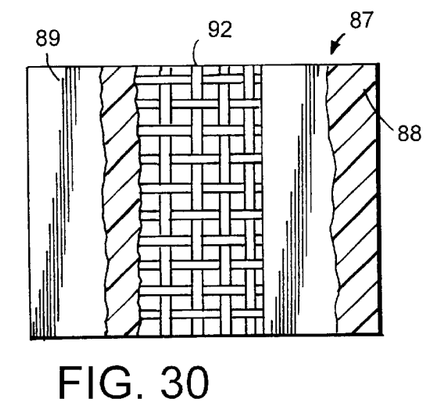
FIG. 30 is a top plan view, partly sectional, of the member of FIG. 28.

Proceeding to FIGS. 28 to 30, there is shown a UHMWPE member 89 illustrated as a flat plate having a body 88 with flat upper and lower surfaces 89 and 91. A mat or layer of reinforcing material 92 is encapsulated within body 88 to increase the bending strength of member 89. The reinforcing material can be a fabric, glass fibers, plastic fibers, a sheet of metal screen, a plastic mesh member, canvas, cloth, or a metal sheet or plate. The layer of material 92 is located along the middle of body 88 with generally equal amounts of UHMWPE above and below the layer of material 92. The opposite side edges of the layer of material 92 can be inwardly from the opposite sides of body 88 and along the length of body 88. The UHMWPE is molecularly attached or bonded to the opposite sides of the layer of material 92. The layer of material 92 reduces stresses in body 88. Body 88 can have shapes other than a flat plate, such as a U or horseshoe shape or the shapes of skis, snow boards, air boat pontoons, dock fenders and vehicle parts. The reinforcing material bonded within the UHMWPE increases the bending strength of the plastic and inhibits the bending strength of the plastic and inhibits sagging and drooping of the body of plastic when subjected to the weight of a heavy object, such as an internal combustion engine. The UHMWPE also absorbs vibrations and sounds.

Figure 26:
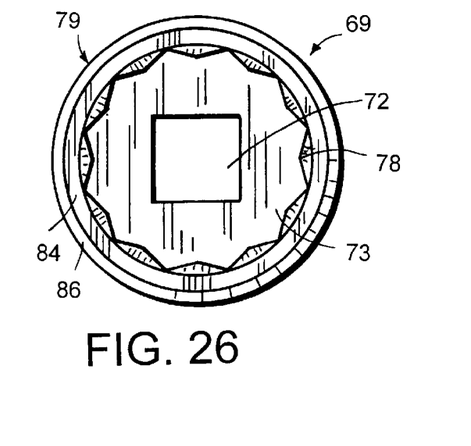
FIG. 26 is a bottom plan view of FIG. 24.
Figure 27:
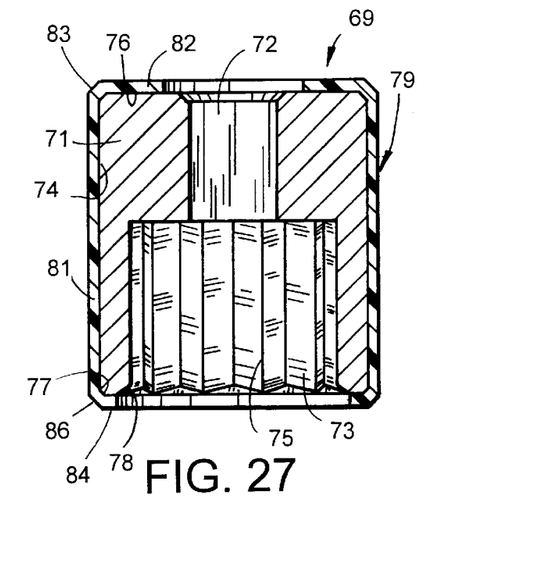
FIG. 27 is an enlarged sectional view taken along line 27—27 of FIG. 25.
Figure 31:
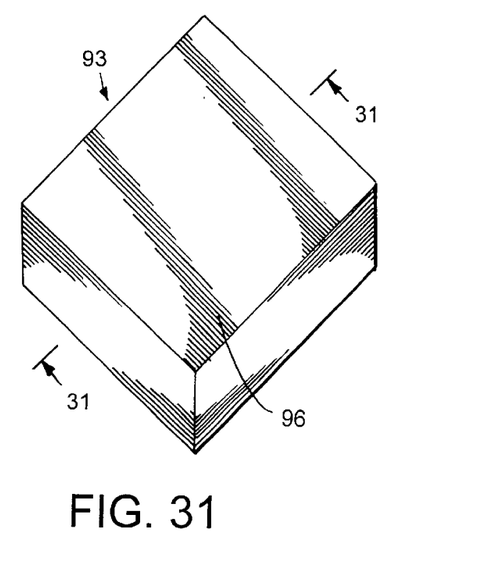
FIG. 31 is a perspective view of a second UHMWPE member.
Figure 32:
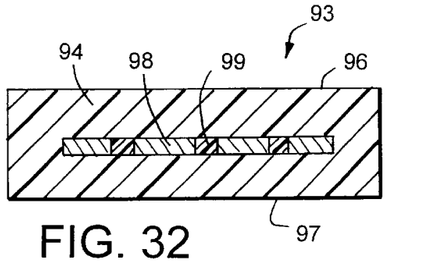
FIG. 32 is an enlarged cross sectional view taken along the line 32—32 of FIG. 31.
Figure 33:
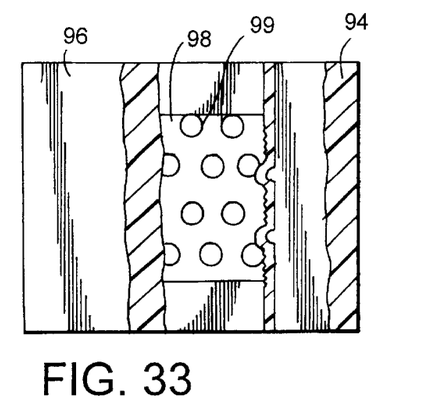
FIG. 33 is a top plan view, partly sectional, of the member of FIG. 31.

As shown in FIGS. 31 to 33, a UHMWPE article or member 93, shown as a plate, has a body 94 with flat upper and lower surfaces 96 and 97. Body 94 can have a curved or an arcuate shape. A reinforcing metal plate 98 having a plurality of holes 99 is embedded within body 94 to increase the bending strength of body 94. As shown in FIGS. 26, plate 98 is located in the middle section of body 94 with about equal thickness of plastic above and below plate 98. Plate 98 can be located adjacent one of the surfaces 96 or 97 of body 94. A second plate (not shown) can be incorporated within body 94. One plate can be located adjacent surface 96 and the other plates located adjacent surface 97. The member 93 can be bent or curved after the plate 98 has been bonded to the UHMWPE.

Figure 34:
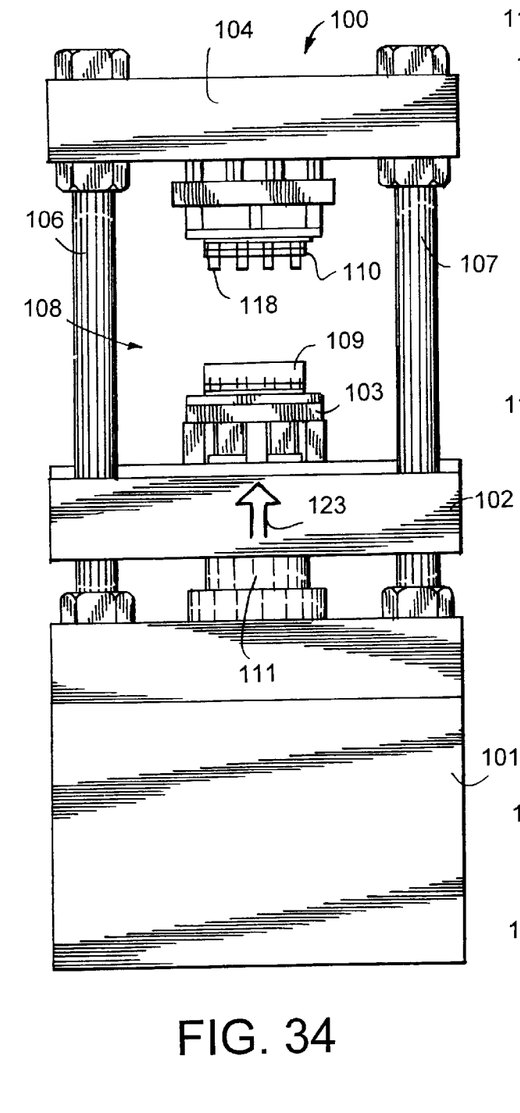
FIG. 34 is a front elevational view of a UHMWPE molding machine having a UHMWPE compression mold.

The method of making the UHMWPE article having a reinforcing member such as members 92 and 98, uses a mold having a cavity with a shape that defines the shape and size of the article. A plunger is forced into the cavity to compress the UHMWPE. A first layer of particulate UHMWPE is deposited into the cavity. The reinforcing member is placed in the cavity on top of the first layer of UHMWPE. The reinforcing member is then covered with a second layer of particulate UHMWPE by depositing additional UHMWPE into the cavity. The particulate UHMWPE is a powdered UHMWPE having an average particle size between 100 to 400 $\mu$m. The plunger is used to compress the particulate UHMWPE to increase the density and cohesion of the particulate UHMWPE. The compression of the UHMWPE also expells air from the particulate plastic. An example of a compression molding machine is shown in FIG. 34. The layers of particulate UHMWPE and reinforcing member is subjected to a pressure of about 1500 to 6000 psi. Other pressures can be applied to the layers of particulate UHMWPE as required by the size and geometry of the molded article. The pressure is adjusted to ensure substantially uniform pressure on the particulate UHMWPE located in the female mold cavity and penetration of the UHMWPE into the reinforcing material. The compressed layers of particulate UHMWPE are heated to a temperature in the range of 250 to 350 degrees F. The pressure on the layers of UHMWPE is maintained during the heating of the UHMWPE and for a duration sufficient to sinter the UHMWPE and molecularly attach the UHMWPE to the reinforcing member. The UHMWPE is then cooled to a temperature below the melting temperature of UHMWPE with the pressure material on the UHMWPE. The duration of cooling of the UHMWPE is adjusted to ensure complete cooling of all of the UHMWPE. The cooled UHMWPE is removed from the mold cavity as a completed article.

A compression molding machine 100, shown in FIG. 34, is used in the process of making a UHMWPE cap on the head of a bolt and a jacket on a cylindrical member. Compression molding machines are also used to make UHMWPE parts reinforced with materials and metals. Machine 100 has a base 101 enclosing a hydraulic cylinder, a pump, and controls for operating the machine. A bed 102 mounted on cylindrical rods 106 and 107 supports a table 103. A cross head 104 is attached to the upper ends of rods 106 and 107. A mold assembly, indicated generally at 108, has a female member 109 mounted on table 103 and male member 110 mounted on cross head 104 above female member 109. An upright cylinder 111 mounted on base 101 is used to move bed 102 toward and away from the cross head 104 to operate mold assembly 108.

Figure 35:
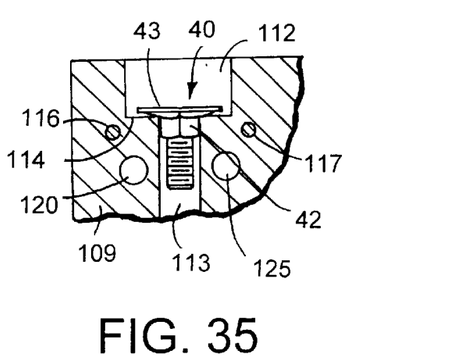
FIG. 35 is a sectional view of a portion of the mold shown in FIG. 34 with a bolt positioned in the mold.

Mold female member 109 has a number of cavities 112 and bolt retaining openings or holes 113 for holding bolts. One cavity 112 and bolt retaining hole 113 is shown in FIG. 35. The remaining cavities and holes have the same shapes as cavity 112 and hole 113. Cavity 112 has a cylindrical shape and a flat bottom. Mold 109 has an annular shoulder or wall 114 at the bottom of cavity 112 surrounding bolt retaining hole 113. Hole 113 has a square cross section to accommodate the square neck 42 of bolt 40 and hold bolt 40 in an upright position. The head 43 of bolt 40 is located in cavity 112. The inside portion of the bottom of head 43 rests on the wall 114 around hole 113, when neck 42 is in hole 113. Mold heating rods or elements 116 and 117 located in member 109 adjacent cavities 112 heat member 109 and particulate UHMWPE located in cavities 112. Heating elements are electric heating members connected to a source of electric power. Other types of heating devices can be used to heat mold members 109 and 110. Member 109 has passages 120 and 125 for accommodating cooling liquids to cool mold member 109.

Mold member 110 has a number of plungers 118 operable to compress particulate UHMWPE located in cavities 112. Plungers 118 are downwardly directed cylindrical members having diameters slightly less than the diameter of the cylindrical cavities 112. Plungers 118 have a close sliding fit with the cylindrical walls of member 109. Electric heating elements or rods 119 and 121 located in member 110 adjacent each plunger 118 are operable to transfer heat to plungers 118 and UHMWPE located in cavities 112.

Figure 36:
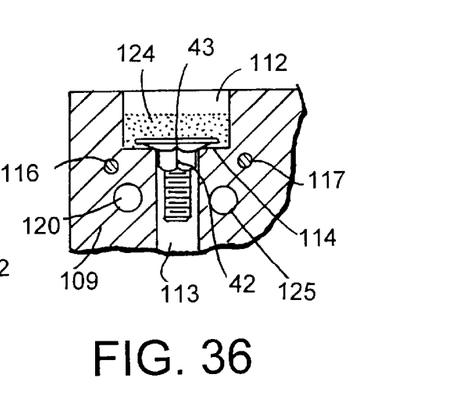
FIG. 36 is a sectional view similar to FIG. 35 with particulate UHMWPE located in the mold.
Figure 37:
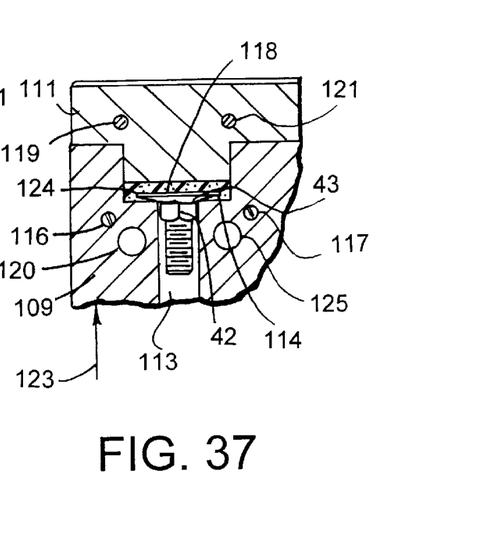
FIG. 37 is a sectional view similar to FIG. 36 with UHMWPE plastic compressed about the head of the bolt.

As shown in FIGS. 35 to 37 a UHMWPE cap is molded on bolt head 43. Bolt 40 is inserted into cavity 112 to place neck 42 in the square hole 113. Neck 42 located in hole 113 retains bolt in an upright position with the axis of bolt 40 aligned with the axis of cavity 112. The bottom of head 43 adjacent neck 42 rests on shoulder 114. The outer peripheral edge or rim of bolt 40 is spaced inwardly of the cylindrical wall of cavity 112 and above shoulder 114. As shown in FIG. 36, particulate UHMWPE 124 is deposited in cavity 112 around and above head 43. The thickness of the top of the cap 44 on head 43 is related to the amount of particulate UHMWPE placed in cavity 112. The volume of particulate UHMWPE is about 2 to 2.5 times the volume of the part or cap manufactured from it the particulate UHMWPE is a powdered linear polyethylene having an average particle size from 100 to 400 μm. The particulate UHMWPE in cavity 112 is compressed around head 43, as shown in FIG. 31, by moving plunger 118 into cavity 112. Cylinder 111 is expanded to move bed 102 and cross head 104 toward each other as shown by arrows 122 and 123 to move plunger 118 into cavity 112. The particulate UHMWPE is subjected to a pressure of about 1500 to 6000 psi. Other pressures can be used to compress the particulate UHMWPE. The pressure applied to the particulate UHMWPE depends on the amount of UHMWPE to be processed and the geometry of the molded part. Higher pressures are used for larger amounts of particulate UHMWPE and for shapes which have different wall thicknesses. The compression of the particulate UHMWPE increases the density and cohesion of the particulates and expels gases from the particulate mass. The compressed UHMWPE is heated to a temperature in the range of 275 to 350 degrees F. with heating elements 116, 117, 119 and 121. The pressure on the compressed UHMWPE is maintained during the heating of the male and female mold members 109 and 110 and the transfer of heat to the compressed UHMWPE. The heat subjected to the compressed UHMWPE is at temperatures above the crystalline melting point of UHMWPE for a time sufficient to sinter the UHMWPE and molecularly attach the UHMWPE to head 43 of bolt 40. The temperature is preferably between 300 to 320 degrees F. The time that the UHMWPE is subjected to heat is a duration that ensures that all parts of the compressed UHMWPE is within the sintering temperature ranges of the UHMWPE in cavity 112. The increase in pressure of the heated UHMWPE in addition to the pressure applied with plunger 118 increases the densification of the UHMWPE and molecular attachment of the UHMWPE to all areas of head 43 located in the cavity 112. The annular lip 48 located under head 43 is firmly attached to the bottom of head 43. The mold assembly 108 is kept in its closed position applying pressure of the UHMWPE as it is cooled to external environmental temperature. Cooling occurs by heat transfer to surrounding metal members 109 and 111 and air. Coolants, such as air or water in the male and female members 109 and 110 flow through passages 120 and 125 to increase the rate of cooling of the UHMWPE in the mold cavity 112. The cooling time depends on the size of the molded part and the method used to transfer heat from the male and female members 109 and 110. The cooling duration is adjusted to allow all the UHMWPE to attain a generally uniform temperature below the melting temperature of UHMWPE. The pressure on the UHMWPE is removed after the cooling is completed. The mold assembly 109 is expanded to withdraw plunger 118 from cavity 112. The UHMWPE cap 44 attached to head 43 of bolt 40 is then removed from female member 109. Air under pressure in opening 113 can be used to expel bolt 40 out of cavity 112.

Referring to FIGS. 38 to 40, there is shown a female mold member 126 of a mold assembly including a male member having a plunger 134. Member 126 has a cavity 127 and a downwardly extend bolt retaining opening or hole 128 open to the bottom of cavity 127. Cavity 127 has the shape of member 59. The shape and size of cavity 127 conforms to the shape of the completed part, such as a motor support or plate. Opening has a diameter slightly less than the diameter of body 62 of bolt 61. Body 62 fits into opening 128 and engages the cylindrical wall 130 of member 126 surrounding opening 128 to retain bolt 61 in an upright position and stabilize bolt 61 on mold member 126.

Mold member 126 has a flat annular wall or shoulder 132 at the bottom of cavity 127 surrounding opening 128. Heating elements or rods 129 and 131 are located in member 126 adjacent wall 132. Heating elements 129 and 131 are electric heating members coupled to a source of electric power operable to heat member 126 which conducts heat to particulate UHMWPE located in cavity 127. Other types of heating devices can be used to heat member 126 or subject particulate UHMWPE to a selected temperature range.

A UHMWPE member 59 is attached to head 63 and projections 64–67. Additional bolts, such as bolts, 60 and 61, can be attached to member 59 currently with bolt 61. Mold member 126 can have additional bolt retaining openings for accommodating additional bolts. The bolt 61 is placed in cavity 127 with body 62 located in opening 128. Projections 64–67 have lower ends that engage wall 132 and space the bottom of head 63 above wall 132. As shown in FIG. 39, particulate UHMWPE 133 is deposited in cavity 127 above and around head 63. The selected thickness of plate 59 or size and shape of the completed object determines the amount of particulate UHMWPE placed in cavity 127. The average particle size of the particulate UHMWPE is in the range described herein with reference to particulate UHMWPE 124. Female member 126, shown in FIG. 40, moves up into plunger 134 to subject particulate UHMWPE to pressure to increase the density of the particles and reduce gas and voids in the mass of particulate UHMWPE. The compressed particulate UHMWPE is heated under pressure with heat conducted from heating elements 129 and 131 and heating elements in the male member of the mold assembly. The pressure, heating temperature range, cooling, and removal of completed plate is the same as herein described with reference to FIGS. 35 to 37.

Figure 41:
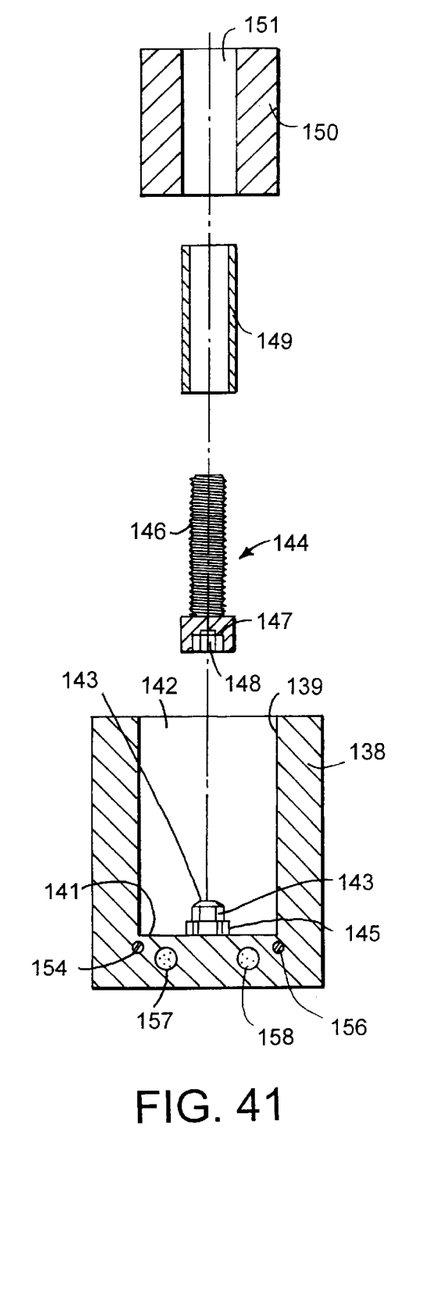
FIG. 41 is an exploded sectional view of a mold for a socket head cap screw.
Figure 42:
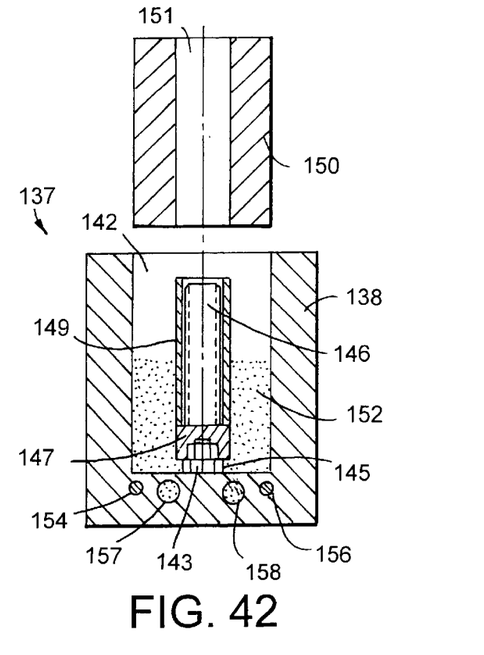
FIG. 42 is a sectional view of the mold of FIG. 41 with particulate UHMWPE plastic located in the mold.
Figure 43:
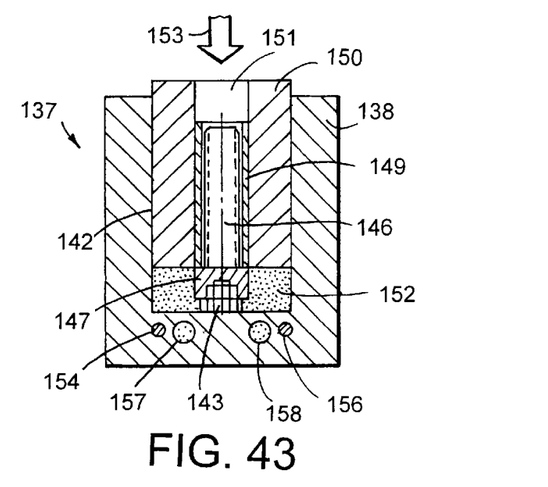
FIG. 43 is a sectional view similar to FIG. 41 with UHMWPE plastic compressed about the head of the cap screw.
Figure 44:
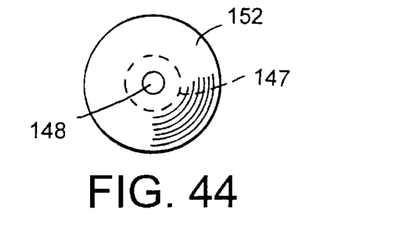
FIG. 44 is a top plan view of the cap screw with UHMWPE ring joined to the head of the cap screw.
Figure 45:
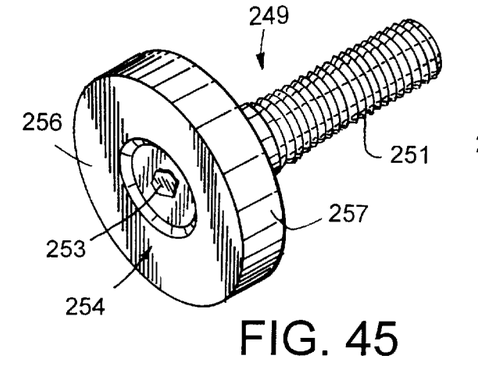
FIG. 45 is a perspective view of a cap screw having a head with a UHMWPE cap.
Figure 46:
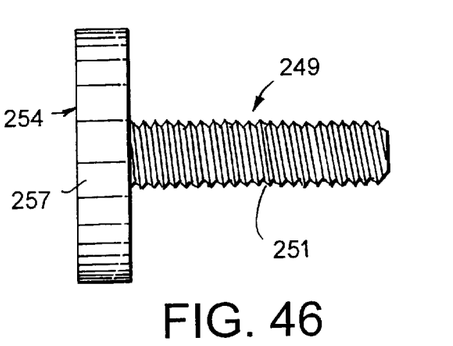
FIG. 46 is a side elevational view of FIG. 45.
Figure 47:
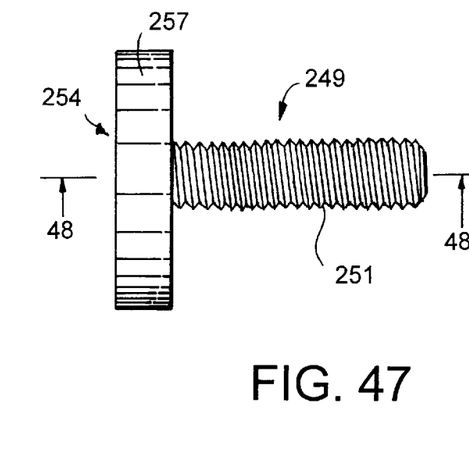
FIG. 47 is a top plan view of FIG. 45.
Figure 48:
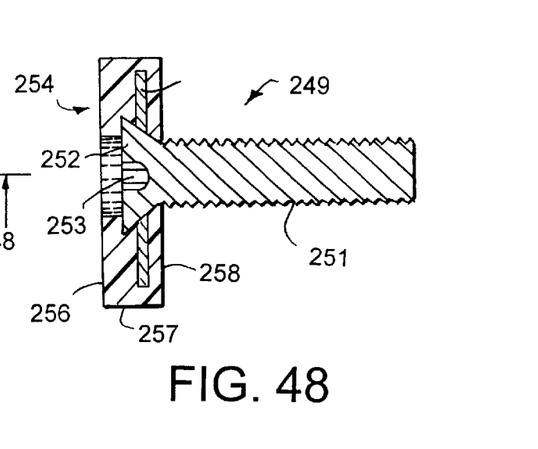
FIG. 48 is a sectional view taken along line 48—48 of FIG. 47.
Figure 49:
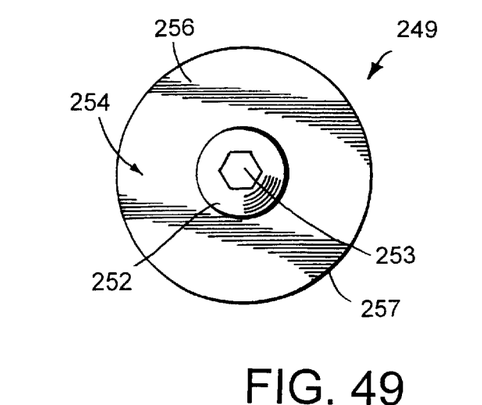
FIG. 49 is a top plan view of FIG. 45.
Figure 50:
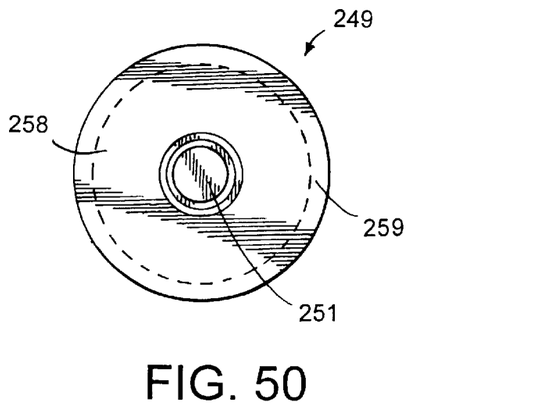
FIG. 50 is a bottom plan view of FIG. 45.
Figures 51, 52:
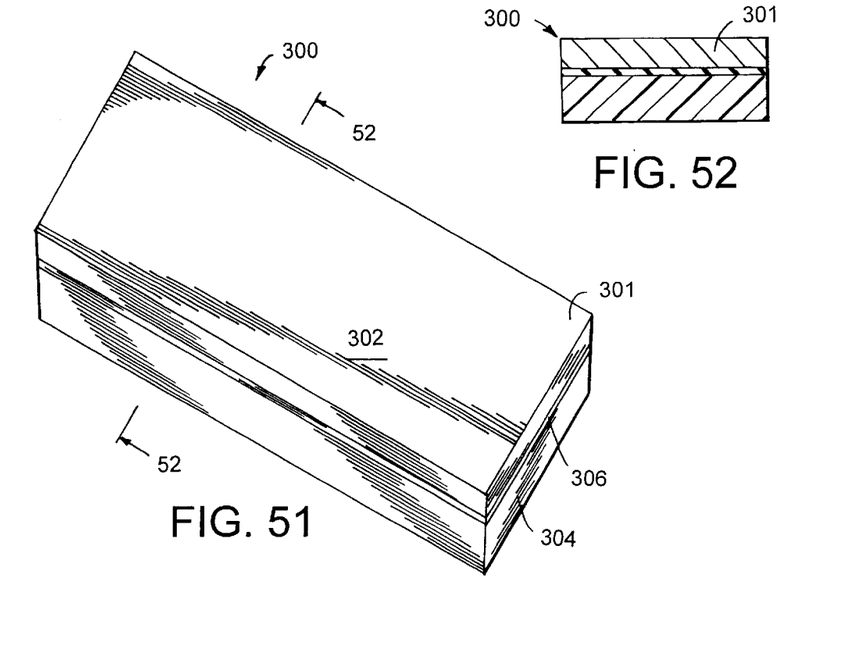
FIG. 51 is a perspective view of a combined metal and UHMWPE plate.
FIG. 52 is a sectional view taken along line 52—52 of FIG. 51.
Figure 53:
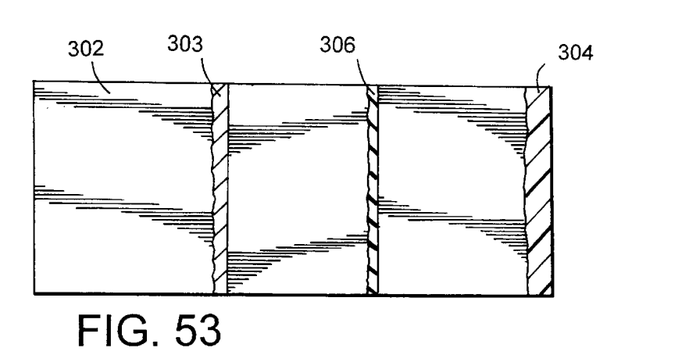
FIG. 53 is a transversely sectioned top plan view of FIG. 51.

A mold assembly 137 for a socket head cap screw 144 shown in FIGS. 41 to 43, has a female member 138 and a male member 150 operable to attach a UHMWPE sleeve or ring on the head of a screw 144. Member 138 has an inside cylindrical wall 139 and a flat bottom wall 141 surrounding a cavity 142. A hexagonal boss or short shaft 143 secured to the center of bottom wall 141 retains cap screw 144 in an upright position in cavity 142. The axis of cap screw 144 coincides with the upright axis of cavity 142. Cap screw 144 has a threaded body or stem 146 joined to a cylindrical head 147 having a hexagonal socket or recess 148. Socket 148 fits over boss 143 to hold cap screw 144 on member 138. Boss 143 extends upwardly from a cylindrical member 145 joined to bottom wall 141. Member 145 spaces the outer end of head 147 above bottom wall 141. A tubular member or sleeve 149 surrounds the entire length of body 146, as shown in FIGS. 42 and 43. The male member 150 is a tubular cylindrical plunger having an axial center passage or bore 151 having a size to slidably fit over sleeve 146. The inside diameter of sleeve 146 slidably accommodates body 146 of cap screw 144 whereby plunger 151 telescopes over sleeve 149 to maintain cap screw 144 in its upright position during compression of particulate UHMWPE 152 in cavity 152 around the sides and top of head 147.

The process of molecularly attaching a UHMWPE collar or ring 152, as shown in FIG. 43, on cap screw 147 is commenced by placing head 147 of cap screw 144 on hexagonal boss 143 to locate cap screw 144 in cavity 142 with the outer end of head spaced above bottom wall 141. Sleeve 149 is placed over body 146 of cap screw 144. As shown in FIG. 42, particulate UHMWPE is deposited in cavity around the sides and outer end of head 147 and sleeve 149. The amount of particulate UHMWPE deposited in cavity 142 is dependent upon the size and shape of the collar bonded to head 147. Plunger 151 is moved down into cavity 142 to apply pressure to the particulate UHMWPE 152. Heating elements 154 and 156 are operational to heat member 138 which transfers heat to the compressed UHMWPE. The pressure on the UHMWPE is maintained during the heating stage. After the heating cycle, the mold 138, compressed UHMWPE and cap screw are cooled with a cold liquid flowing through passages 157 and 158. The duration of the cooling cycle is adjusted to insure that all the UHMWPE is cooled to a generally uniform temperature below the melting temperature of UHMWPE. The cap screw joined to the UHMWPE is then removed from the mold. The heating temperature range, cooling, and removal of the completed combined cap screw and UHMWPE collar is the same as herein described with reference to FIGS. 35 to 37.

A modification of the cap screw 249 with a UHMWPE cap 254 is shown in FIGS. 45 to 50. Cap screw 249 has a threaded body or stem 252 and a cone shaped head 252 with a hexagonal socket 253. A cap 254 comprising UHMWPE is molecularly bonded to head 252 and an annular washer 259 surrounding the head 252. Washer 259 engages the tapered inside wall of head and provides a large annular surface to anchor the UHMWPE and prevent cap 254 from being pulled off head 252. Cap 254 has a flat top surface 256, a cylindrical side wall 257 and an inside wall 258. Wall 258 is located below washer 259. The molding process shown in FIGS. 41 to 43 is used to mold the UHMWPE cap 254 on head 252 and washer 259.

A combined metal and UHMWPE plate 300, shown in FIGS. 51 to 55, has a metal sheet or layer 301 and a generally flat body 304 of UHMWPE joined to metal sheet 301. Sheet 301 smooth metal member having uniform thickness with generally flat upper and lower surfaces 302 and 303. Sheet 301 can be steel, aluminum or other metals. A rubber-like chemical locking adhesive layer 306 located between metal sheet 301 and UHMWPE body 304 joins sheet 301 to body 304.

Figure 54:
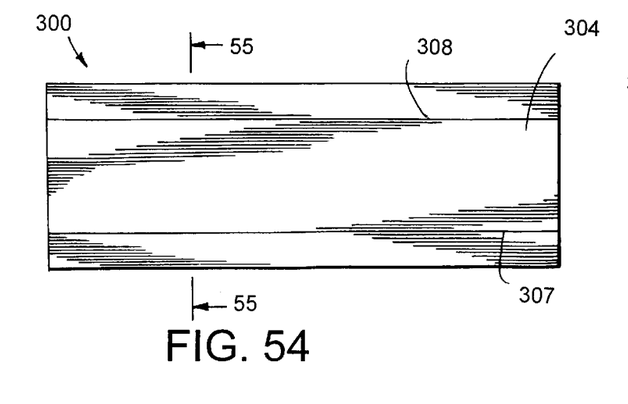
FIG. 54 is a bottom plan view of the plate of FIG. 51 bent to a longitudinal channel shape.
Figure 55:
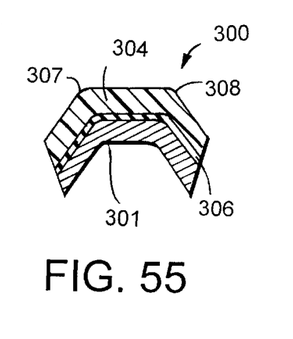
FIG. 55 is a sectional view taken along line 55—55 of FIG. 54.

The combined metal and UHMWPE plate 300 is made by cleaning the surface 303 of metal sheet 301 with sandblasting the entire surface 303 and etching surface 303 with a liquid etching chemical. The adhesive layer 306 is applied to the etched surface 303. A pressure molding machine, as shown in FIG. 34, equipped with a male and female mold assembly is used to molecularly bond metal surface 303 to layer 306 and UHMWPE to layer 306. The mold assembly has a cavity having the shape of the finished article. A measured amount of powdered UHMWPE is placed in the cavity. The metal sheet 303 and layer 306 is placed on top of the powdered UHMWPE in the cavity. The powdered UHMWPE, layer 306, and flat metal sheet 301 is subjected to high pressure and heat between 250 to 350 degrees F. The duration of the heating cycle is adjusted to ensure that all the powdered UHMWPE is sintered into a solid UHMWPE body. The heat cures the adhesive 306 and bonds the metal sheet surface 303 and UHMWPE to the adhesive. The pressure on the metal sheet 301 and UHMWPE is maintained during the heating cycle. After the heating cycle is completed the mold assembly is cooled to a temperature below the melting temperature of UHMWPE. The pressure on the metal sheet 301 and UHMWPE body 304 is maintained during the cooling duration. The duration of the cooling cycle is also adjusted to ensure complete cooling of the UHMWPE. The mold assembly is separated and the combined metal and UHMWPE plate 300 is removed from the mold assembly. As shown in FIGS. 54 and 55, the combined metal and UHMWPE plate 300 is pressed or bent into a channel shape. The UHMWPE has longitudinal linear corners 307 and 308. The metal sheet 301 reinforces the UHMWPE body 304 along its entire length.

Modifications of the process and products of the invention may be made by persons skilled in the art without departing from the invention as defined in the following claims.

What is claimed is:

1. A method of joining a cap of UHMWPE to the head of a bolt having a body and a head comprising:
   placing the body of the bolt in a bolt retaining opening of a mold having bottom wall and a side wall surrounding a cavity with the head of the bolt located in the cavity,
   depositing particulate UHMWPE in the cavity around the head of the bolt,
   compressing the particulate UHMWPE in the cavity around the head of the bolt,
   heating the compressed particulate UHMWPE to a temperature of between 250 and 350 degrees F. to molecularly bond the UHMWPE to the head of the bolt,
   adjusting the duration of the heating to sinter all of the UHMWPE,
   cooling the UHMWPE and the bolt,
   adjusting the duration of the cooling of the UHMWPE to allow all of the UHMWPE to cool to a temperature below the melting temperature of UHMWPE, and
   removing the bolt with the UHMWPE cap bonded to the head of the bolt from the cavity of the mold.

2. The method of claim 1 including: spacing the head of the bolt above the bottom wall at the bottom of the cavity.

3. The method of claim 1 wherein: the particulate UHMWPE is compressed to a pressure of between 1500 and 6000 psi.

4. The method of claim 1 wherein: the compressed particulate UHMWPE is heated to a temperature between 300 to 320 degrees F.

5. The method of claim 1 wherein: the pressure on the particulate UHMWPE is maintained during the heating and cooling of the compressed UHMWPE.

6. The method of claim 1 wherein: the depositing of particulate UHMWPE in the cavity comprises placing powdered UHMWPE having an average particle size between 100 to 400 μm in the cavity.

7. The method of claim 1 including: spacing the head of the bolt above the bottom wall at the bottom of the cavity, the depositing of particulate UHMWPE in the cavity comprises placing powdered UHMWPE having an average particle size between 100 to 400 μm in the cavity around and above the head of the bolt, the compressing of the particulate material comprises apply a pressure of between 1500 to 6000 psi to the powdered UHMWPE in the cavity, and the heating of the compressed UHMWPE compresses heating the compressed UHMWPE to a temperature between 300 to 320 degrees F.

8. The method of claim 7 wherein: the pressure of the particulate material is maintained during the heating and cooling of the compressed UHMWPE.

9. A method of making a UHMWPE body having a reinforcing member with a mold having a cavity comprising:
    depositing a first layer of particulate UHMWPE in a cavity of a mold,
    placing a reinforcing member in the cavity above the first layer of particulate UHMWPE,
    depositing a second layer of particulate UHMWPE to the cavity on top of the reinforcing material,
    compressing the first and second layers of particulate UHMWPE and reinforcing member in the cavity,
    heating the compressed particulate UHMWPE and reinforcing member to a temperature of between 250 and 350 degrees F. to molecularly bond the UHMWPE to the reinforcing member,
    cooling the UHMWPE and reinforcing member, and
    removing the UHMWPE and reinforcing member from the cavity of the mold.

10. The method of claim 9 wherein: the particulate UHMWPE is compressed to a pressure of between 1500 to 6000 psi.

11. The method of claim 9 wherein: the compressed particulate UHMWPE is heated to a temperature between 300 to 320 degrees F.

12. The method of claim 9 wherein: the pressure on the particulate UHMWPE is maintained during the heating and cooling of the compressed UHMWPE.

13. The method of claim 9 wherein: the depositing of the first and second layers of particulate UHMWPE in the cavity comprises placing powdered UHMWPE having an average particle size between 100 to 400 μm in the cavity.

14. The method of claim 9 wherein: the placing of a reinforcing member in the cavity comprises placing a metal plate in the cavity on the first layer of particulate UHMWPE in the cavity.

15. The method of claim 9 wherein: the placing of a reinforcing member in the cavity comprises placing a layer of generally flat woven fibers in the cavity on the first layer of particulate UHMWPE in the cavity.

16. The method of claim 9 including: the depositing of the first and second layers of particulate UHMWPE in the cavity comprises placing powdered UHMWPE having an average particle size between 100 to 400 μm in the cavity around the reinforcing member, the compressing of the particulate UHMWPE comprises apply a pressure of between 1500 to 6000 psi to the powdered UHMWPE in the cavity, and the heating of the compressed UHMWPE compresses heating the compressed UHMWPE to a temperature between 300 to 320 degrees F.

17. The method of claim 9 wherein: the pressure of the particulate UHMWPE is maintained during the heating and cooling of the compressed UHMWPE.

18. A method of joining a collar of UHMWPE to the head of a cap screw having a head and body, said head having a socket, comprising: placing the socket of the head on a holder in a mold having a cavity to retain the cap screw in an upright position in the cavity, placing a sleeve around the body of the screw, depositing particulate UHMWPE in the cavity around the head of the screw and sleeve, compressing the particulate UHMWPE in the cavity around the head of the cap screw, heating the compressed particulate UHMWPE in the cavity to a temperature of between 250 and 350 F., cooling the UHMWPE and cap screw, and removing the cap screw, sleeve and UHMWPE collar from the mold.

19. The method of claim 18 wherein: the particulate UHMWPE is compressed to a pressure of between 1500 to 6000 psi.

20. The method of claim 18 wherein: the compressed particulate UHMWPE is heated to a temperature between 300 to 320 degrees F.

21. The method of claim 18 wherein: the pressure on the particulate UHMWPE is maintained during the heating and cooling of the compressed UHMWPE.

22. The method of claim 18 wherein: the depositing of particulate UHMWPE in the cavity comprises placing powdered UHMWPE having an average particle size between 100 to 400 μm in the cavity.

23. The method of claim 18 including: the depositing of particulate UHMWPE in the cavity comprises placing powdered UHMWPE having an average particle size between 100 to 400 μm in the cavity around and above the head of the cap screw, the compressing of the particulate material comprises apply a pressure of between 1500 to 6000 psi to the powdered UHMWPE in the cavity, and the heating of the compressed UHMWPE compresses heating the compressed UHMWPE to a temperature between 300 to 320 degrees F.

24. The method of claim 23 wherein: the pressure of the particulate material is maintained during the heating and cooling of the compressed UHMWPE.

25. A method of joining a cap of UHMWPE to the head of a member having a body and a head comprising: placing the body of the member in a member retaining opening of a mold having a bottom wall and a side wall surrounding a cavity with the head of the member located in the cavity, depositing particulate UHMWPE in the cavity around the head of the member, compressing the particulate UHMWPE in the cavity around the head of the member, heating the compressed particulate UHMWPE to a temperature of between 250 and 350 degrees F. to molecularly bond the UHMWPE to the head of the member, adjusting the duration of the heating to sinter all of the UHMWPE, cooling the UHMWPE and the member, adjusting the duration of the cooling of the UHMWPE to allow all of the UHMWPE to cool to a temperature below the melting temperature of UHMWPE, and removing the member with the UHMWPE cap bonded to the head of the member from the cavity of the mold.

26. The method of claim 25 including: spacing the head of the member above the bottom wall at the bottom of the cavity.

27. The method of claim 25 wherein: the particulate UHMWPE is compressed to a pressure of between 1500 and 6000 psi.

28. The method of claim 25 wherein: the compressed particulate UHMWPE is heated to a temperature between 300 to 320 degrees F.

29. The method of claim 25 herein: the depositing of particulate UHMWPE in the cavity comprises placing powdered UHMWPE having an average particle size between 100 to 400 µm in the cavity.

30. The method of claim 25 including: spacing the head of the member above the bottom wall at the bottom of the cavity, the depositing of particulate UHMWPE in the cavity comprising placing powdered UHMWPE having an average particle size between 100 to 400 µm in the cavity around and above the head of the member, the compressing of the particulate material comprising applying a pressure of between 1500 to 6000 psi to the powdered UHMWPE in the cavity, and the heating of the compressed UHMWPE comprising heating the compressed UHMWPE to a temperature between 300 to 320 degrees F.

31. The method of claims 30 wherein: the pressure of the particulate material is maintained during the heating and cooling of the compressed UHMWPE.

* * * * *